United States Patent [19]

DiSanto et al.

[11] Patent Number: 5,345,251
[45] Date of Patent: Sep. 6, 1994

[54] ELECTROPHORETIC DISPLAY PANEL WITH INTERLEAVED CATHODE AND ANODE

[75] Inventors: Frank J. DiSanto, North Hills; Denis A. Krusos, Lloyd Harbor, both of N.Y.

[73] Assignee: Copytele, Inc., Huntington Station, N.Y.

[21] Appl. No.: 2,623

[22] Filed: Jan. 11, 1993

[51] Int. Cl.$^5$ ............................................... G09G 3/34
[52] U.S. Cl. ..................................... 345/107; 359/296
[58] Field of Search .................. 340/787, 772, 783; 359/296; 345/107, 84, 60

[56] References Cited

U.S. PATENT DOCUMENTS

| | | | |
|---|---|---|---|
| Re. 28,360 | 3/1975 | Evans | 340/787 |
| 4,554,537 | 11/1985 | Dick | 345/60 |
| 4,648,956 | 3/1987 | Marshall | 359/296 |
| 4,686,524 | 8/1987 | White | 340/787 |
| 5,053,763 | 10/1991 | DiSanto et al. | 340/787 |
| 5,187,609 | 2/1993 | DiSanto et al. | 359/296 |

Primary Examiner—Alvin E. Oberley
Assistant Examiner—Aaron Banerjee
Attorney, Agent, or Firm—Plevy & Associates

[57] ABSTRACT

An EPID electrode configuration includes a plurality of parallel, tined, interdigitized anode and cathode lines deposited upon a faceplate. A plurality of guard elements are provided between adjacent pairs of anode and cathode lines. In a first embodiment, grid lines oriented perpendicularly to the anode and cathode lines are applied to a rearplate of the EPID. Alternatively, the grid lines may be deposited on an intermediate coating of SiO$_2$ and photoresist overlying the anode and cathode lines.

28 Claims, 8 Drawing Sheets

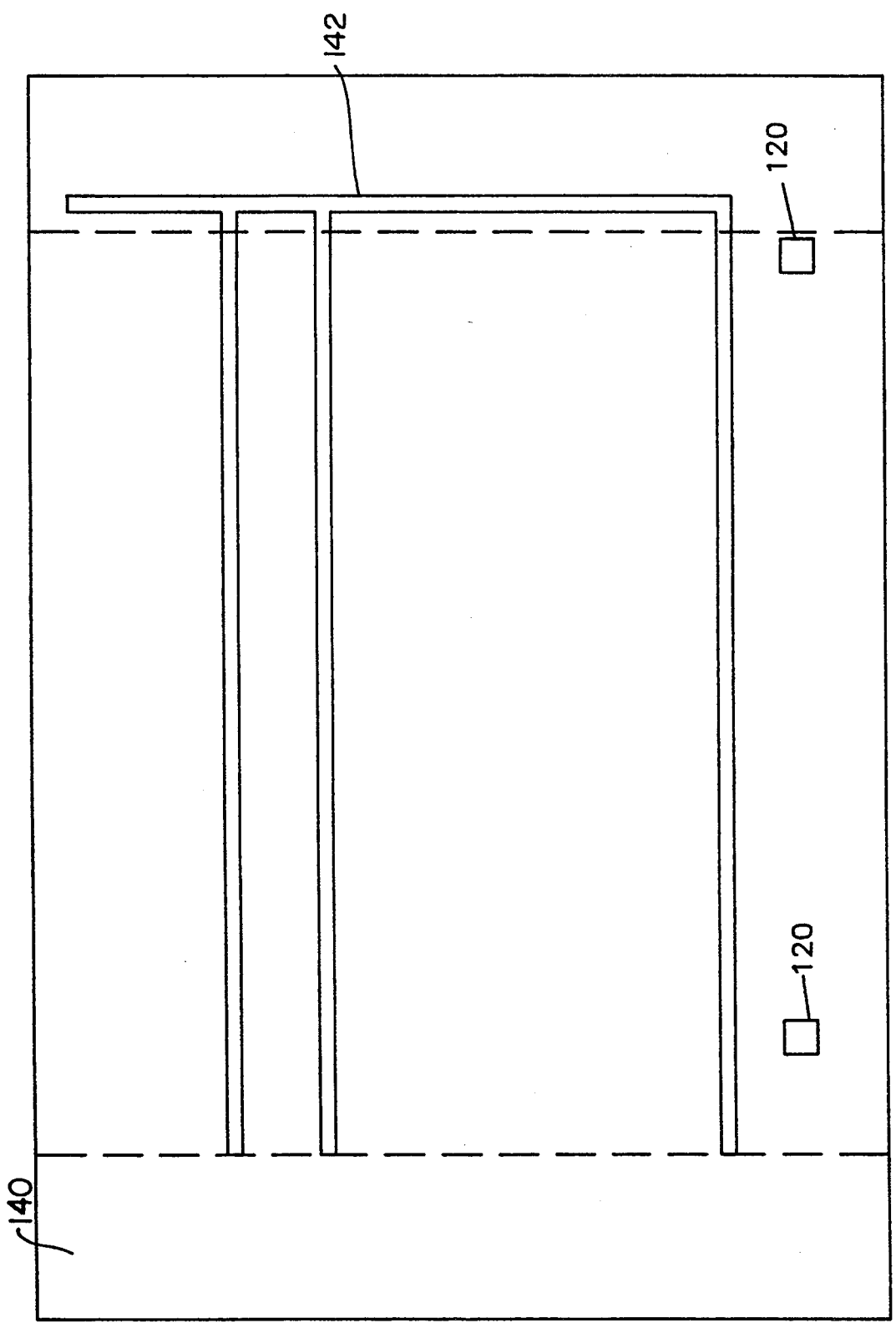

ELECTROPHORETIC DISPLAY PANEL WITH INTERLEAVED CATHODE AND ANODE

FIELD OF THE INVENTION

The present invention relates to an electrophoretic display panel apparatus and methods for making same and, more particularly, to the arrangement of cathode, anode and grid lines in an electrophoretic display.

BACKGROUND OF THE INVENTION

Electrophoretic displays (EPIDS) are now well known. A variety of display types and features are taught in several patents issued in the names of the inventors herein, Frank J. DiSanto and Denis A. Krusos and assigned to the assignee herein, Copytele, Inc. of Huntington Station, N.Y. For example, U.S. Pat. Nos. 4,655,897 and 4,732,830, each entitled ELECTROPHORETIC DISPLAY PANELS AND ASSOCIATED METHODS describe the basic operation and construction of an electrophoretic display. U.S. Pat. No. 4,742,345, entitled ELECTROPHORETIC DISPLAY PANELS AND METHODS THEREFOR, describes a display having improved alignment and contrast. Many other patents regarding such displays are also assigned to Copytele, Inc.

The display panels shown in the above-mentioned patents operate upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized it will cause a visually observable localized pigment particle migration. The localized pigment particle migration results either in a localized area of concentration or rarefaction of particles depending upon the polarity and direction of the electrostatic field and the charge on the pigment particles. The electrophoretic display apparatus taught in the foregoing U.S. Patents are "triode-type" displays having a plurality of independent, parallel, cathode row conductor elements or "lines" deposited in the horizontal on one surface of a glass viewing screen. A layer of insulating photoresist material deposited over the cathode elements and photoetched down to the cathode elements to yield a plurality of insulator strips positioned at right angles to the cathode elements, forms the substrate for a plurality of independent, parallel column or grid conductor elements or "lines" running in the vertical direction. A glass cap member forms a fluid-tight seal with the viewing window along the cap's peripheral edge for containing the fluid suspension and also acts as a substrate for an anode plate deposited on the interior flat surface of the cap. When the cap is in place, the anode surface is in spaced parallel relation to both the cathode elements and the grid elements. Given a specific particulate suspension, the sign of the electrostatic charge which will attract and repel the pigment particles will be known. The cathode element voltage, the anode voltage, and the grid element voltage can then be ascertained such that when a particular voltage is applied to the cathode and another voltage is applied to the grid, the area proximate their intersection will assume a net charge sufficient to attract or repel pigment particles in suspension in the dielectric fluid. Since numerous cathode and grid lines are employed, there are numerous discrete intersection points which can be controlled by varying the voltage on the cathode and grid elements to cause localized visible regions of pigment concentration and rarefaction. Essentially then, the operating voltages on both cathode and grid must be able to assume at least two states corresponding to a logical one and a logical zero. Logical one for the cathode may either correspond to attraction or repulsion of pigment. Typically, the cathode and grid voltages are selected such that only when both are a logical one at a particular intersection point, will a sufficient electrostatic field be present at the intersection relative to the anode to cause the writing of a visual bit of information on the display through migration of pigment particles. The bit may be erased, e.g., upon a reversal of polarity and a logical zero-zero state occurring at the intersection coordinated with an erase voltage gradient between anode and cathode. In this manner, digitized data can be displayed on the electrophoretic display.

An alternative EPID construction is described in application Ser. No. 07/345,825, now U.S. Pat. No. 5,053,763, entitled DUAL ANODE FLAT PANEL ELECTROPHORETIC DISPLAY APPARATUS, which relates to an electrophoretic display in which the cathode/grid matrix is found in triode-type displays is overlayed by a plurality of independent, separately addressable "local" anode lines. The local anode lines are deposited upon and align with the grid lines and are insulated therefrom by interstitial lines of photoresist. The local anode lines are in addition to the "remote" anode, which is the layer deposited upon the anode faceplate or cap as in triode displays. The dual anode structure aforesaid provides enhanced operation by eliminating unwanted variations in display brightness between frames, increasing the speed of the display and decreasing the anode voltage required during Write and Hold cycles, all as explained therein.

An examination of U.S. Pat. No. 5,053,763 reveals that the local anode structure employed therein is realized by applying a layer of photoresist over the grid elements, which are formed from a first metal, such as, chrome. A layer of second metal, e.g., nickel or aluminum, is applied over the photoresist layer. Yet another layer of photoresist is applied over the second metal layer, and is then masked, exposed and developed in the same form as the grid elements. The second metal layer is then etched with a suitable solution. The photoresist between the first and second metal layers is then plasma etched. A layer of $SiO_2$ is then deposited over the resulting structure.

A pair of pending patent applications which have been assigned to the present assignee, Copytele, Inc., may have some relevance to the present invention and are copending with the present application. Application Ser. No. 07/746,854, entitled ELECTROPHORETIC DISPLAY PANEL WITH INTERLEAVED LOCAL ANODE relates to an electrophoretic display construction wherein the local anode elements are interleaved with grid elements of the display within the same claim. Both the local anode elements and the grid elements are deposited upon a photoresist layer overlying the cathode elements residing upon a glass faceplate. The interleaved local anode and grid elements are formed by the use of a mask which forms both simultaneously.

In application Ser. No. 07/796,761, entitled ELECTRODE STRUCTURE FOR AN ELECTROPHO- RETIC DISPLAY APPARATUS, conductor strips are interleaved with character line elements, specifically, anode lines, for solving the problem of crosstalk and the spreading of the electrophoretic effect beyond the intended area associated with a particular anode line segment. In the erase mode, the interleaved control lines are charged with a voltage which has an opposite polarity to that of the anode line segments used to erase a selected character or group of characters. The difference in polarity ensures that the erasure associated with a selected anode line will be restricted to those characters associated with that particular anode line and will not spread to erase adjacent characters which are not to be erased.

It is an object of the present invention to provide an alternative structure and method for making the anode/cathode/grid matrix than that shown in the foregoing patents and applications.

SUMMARY OF THE INVENTION

The problems and disadvantages associated with conventional electrophoretic displays are overcome by the present invention which includes in an electrophoretic display having an X-Y matrix of a plurality of parallel cathode lines arranged in a given direction upon a faceplate of the display and a plurality of grid lines insulated from said cathode lines and disposed generally perpendicular thereto, the improvement of a plurality of anode lines arranged upon the faceplate interpositioned between and insulated from the cathode lines. The EPID may be constructed in accordance with an associated method of fabrication wherein the plurality of alternating parallel cathode lines and anode lines are simultaneously formed on the faceplate of the EPID, each anode and cathode line having a first layer of conductor material deposited upon the faceplate and a second conductor layer deposited over the first layer. The second layer is removed from the cathode lines. Thereafter, a plurality of grid lines are formed perpendicular to the anode and cathode lines. A fluid containing envelope is then formed and filled with electrophoretic fluid. The EPID may be operated in the Erase mode by applying 0 volts to the grid lines, 0 volts to the anode lines and +15 volts to the cathode lines.

BRIEF DESCRIPTION OF THE FIGURES

For a better understanding of the present invention, reference is made to the following detailed description of an exemplary embodiment considered in conjunction with the accompanying drawings, in which:

FIG. 7 is an enlarged plan view of a second mask used in cooperation with the mask shown in FIG. 6 for forming the guard elements of an electrophoretic display in accordance with the second exemplary embodiment of the present invention.

DETAILED DESCRIPTION OF THE FIGURES

Figure 1:
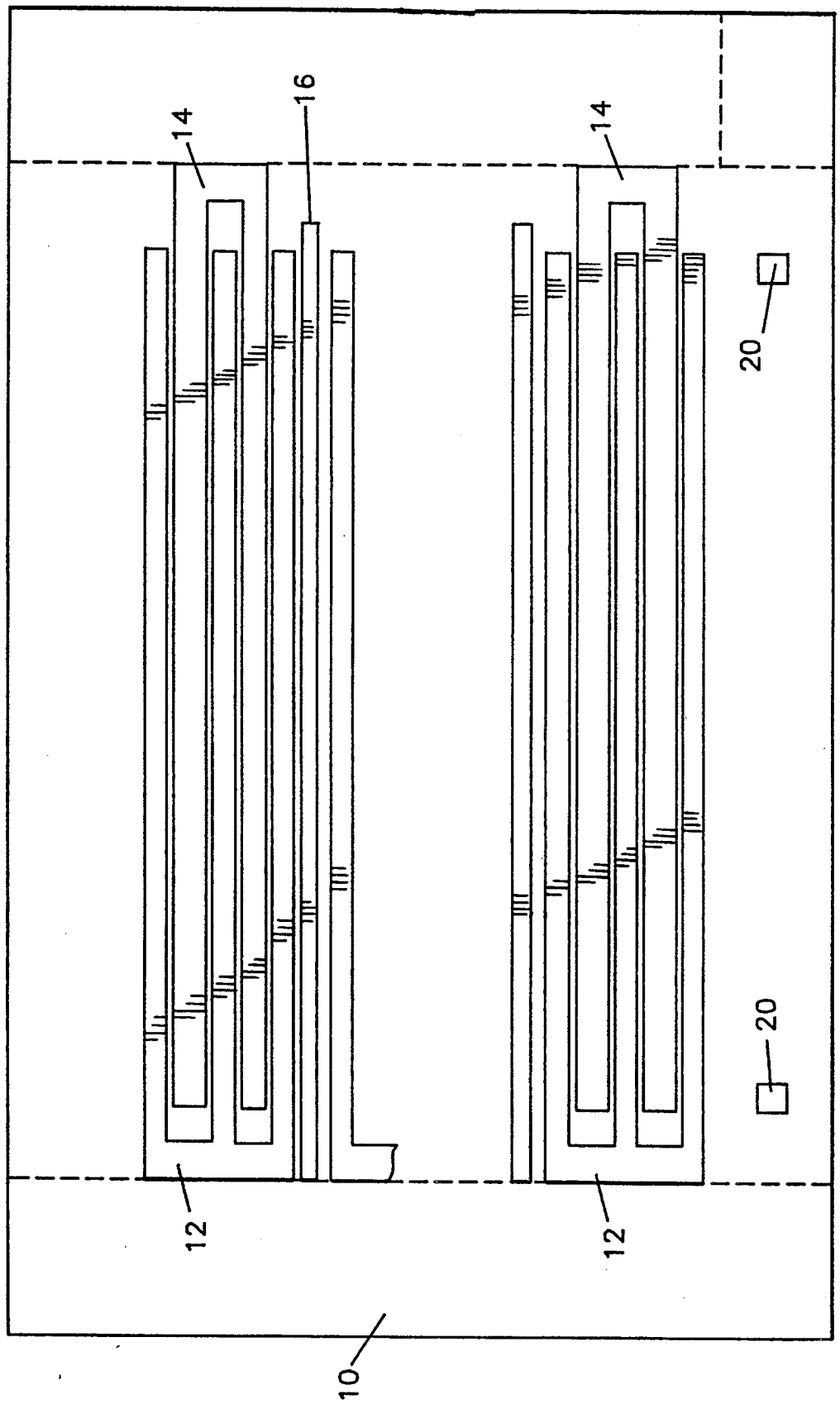
FIG. 1 is an enlarged plan view of interleaved anode and cathode lines on an electrophoretic display faceplate in accordance with an exemplary embodiment of the present invention.

FIG. 1 shows a faceplate 10 for an electrophoretic display having disposed thereon a plurality of conductive cathode elements 12, anode elements 14 and guard elements 16. The cathode and anode elements 12, 14 are each forked, have plural tines and face one another such that the tines are interleaved. The faceplate conventionally is fabricated from glass. The guards 16 are merely straight elements disposed in between each pair of cathode and anode elements. A typical electrophoretic display would have numerous cathode/anode pairs, for example, 704 such groupings are shown in FIG. 1. The forks of the cathode elements 12 and anode elements 14 have been labeled K1-1, K1-2, etc., and A1-1, A1-2, etc., to illustrate that there are three forks emanating from a common area for each cathode element, two forks emanating from a common area for each anode element 14, 704 anode/cathode pairs and 703 intermediate guard elements G1-G703.

The cathode and anode elements 12, 14 are shown greatly enlarged relative to the faceplate 10 for purposes of illustration. Exemplary dimensions of the elements for a workable display are, however, shown in FIG. 1 to provide a suitable example and to show how FIG. 1 relates to FIG. 2. It should be noted that the anode/cathode and guard element 12, 14, 16 pattern illustrated in FIG. 1 is exactly the same pattern as would be employed on a mask for forming them, as is known to one of normal skill in the art of photoetching. The techniques, materials and dimensions used to form conductor elements upon faceplates and in general the method for making EPIDS are disclosed in U.S. Pat. Nos. 4,655,897, 4,732,830 and 4,742,345, which said patents are incorporated herein by reference.

A representative method for fabricating the configuration shown in FIG. 1 would be to coat a glass faceplate 10 with indium-tin-oxide (ITO) which is coated with a layer of chrome and then a layer of resist. The resist is exposed using a mask having an identical configuration as that of the electrode pattern shown in FIG. 1. The resist would be positive acting in this case, such that the area that is exposed to light is made more readily soluble during the development step. After exposure, the photoresist is developed and subsequently placed in a chrome etching solution, followed by a thorough rinsing in deionized water. The rinsed substrate is then placed in an ITO etch and thereafter again rinsed in deionized water.

Figure 2:
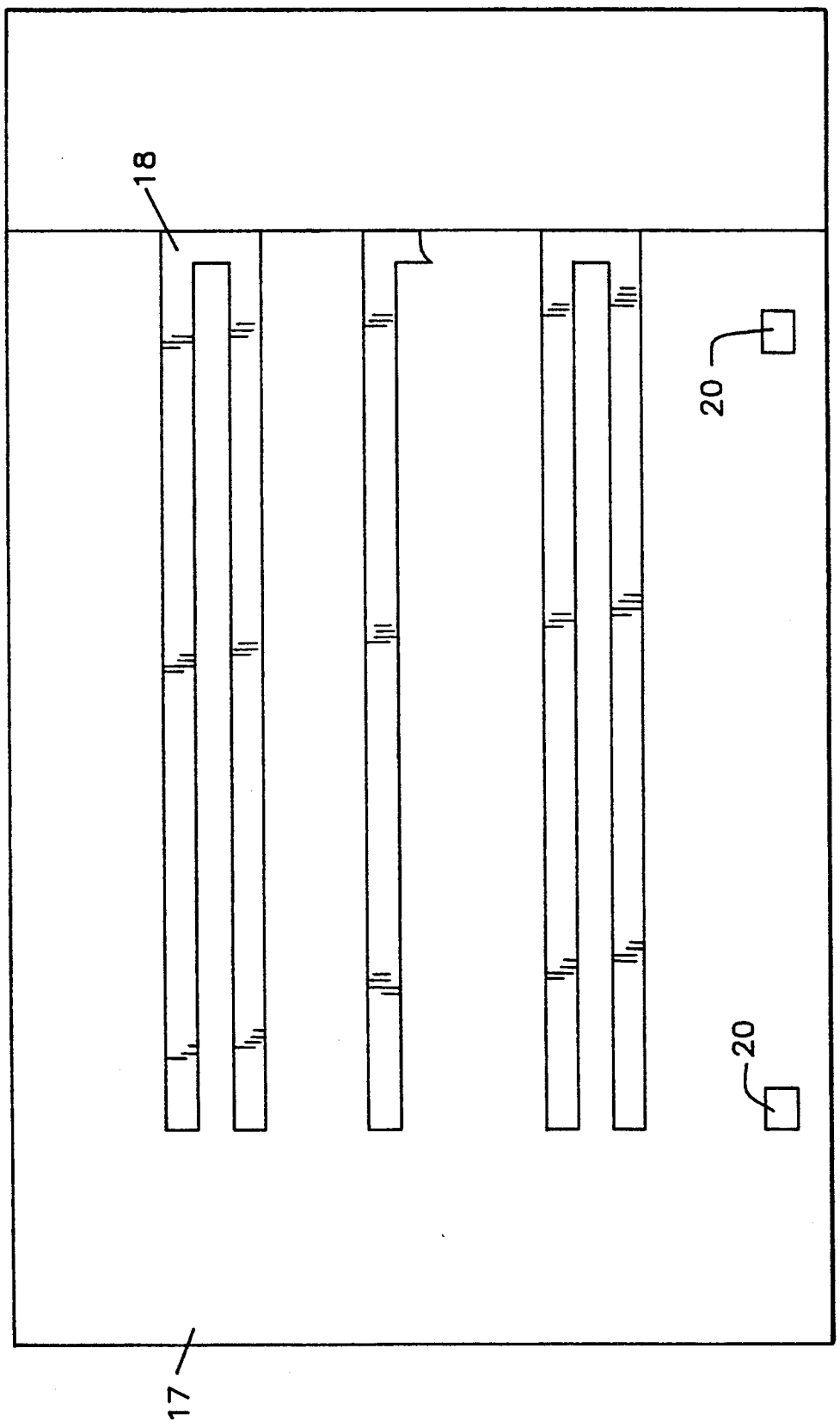
FIG. 2 is an enlarged plan view of a mask for forming the anode/cathode matrix shown in FIG. 1.
Figure 3:
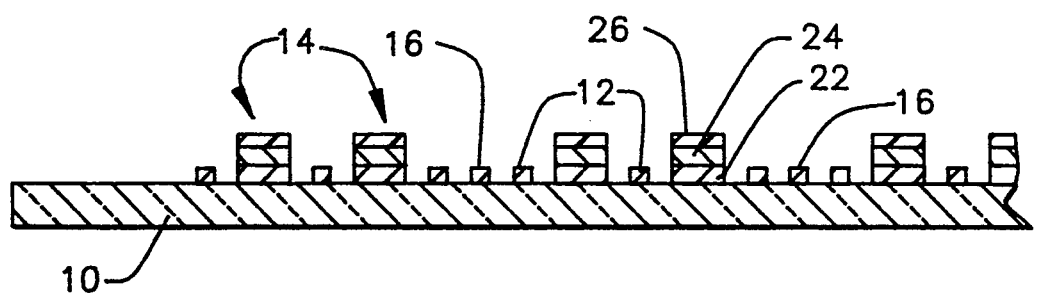
FIG. 3 is an enlarged cross-sectional view of a fragment of an electrophoretic display anode/cathode faceplate as shown in FIG. 1 taken along section line III—III and looking in the direction of the arrows.
Figure 4:
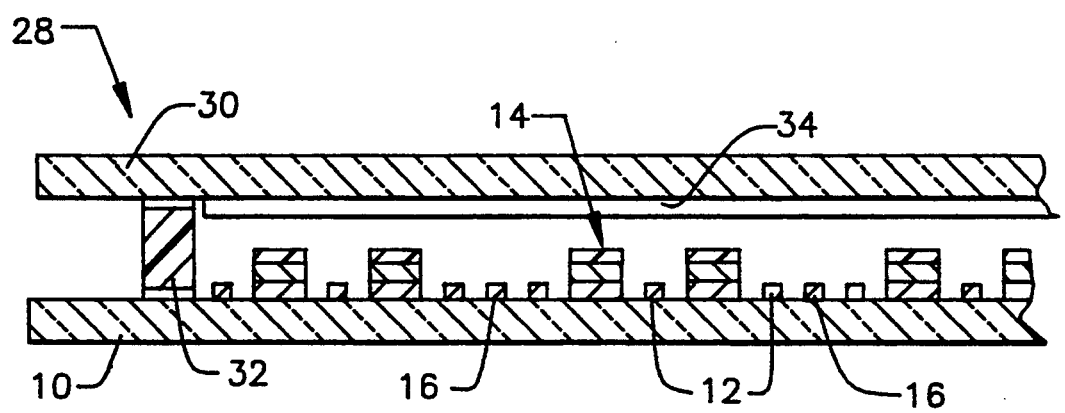
FIG. 4 is a cross-sectional view of a fragment of an electrophoretic display employing the anode/cathode faceplate shown in FIGS. 1 and 3.

FIG. 2 illustrates a second mask which would is utilized in forming an anode/cathode/guard matrix as shown in FIGS. 1 and 3–4. As can be seen, FIG. 2 shows a mask 17 having elements corresponding to the anode elements 14 of FIG. 1, that is, the anode mask elements 18 are dimensioned to precisely overlie the anode elements 14 shown in FIG. 1 when the fiduciary marks 20 of the mask 17 and the faceplate 10 are aligned. The particular dimensions selected and shown in FIGS. 1 and 2 further illustrate the alignment of the anode mask elements 18 and the anode elements 14 shown in FIG. 1. After the mask 17 of FIG. 2 is aligned with the substrate formed by the steps described above, the substrate is illuminated with light through the mask 17. The substrate is then developed and placed in a chrome etching solution. All chrome is thereby removed from the substrate except that which has been deposited on the anode elements 14.

FIG. 3 further illustrates the resulting structure achieved by the method described above. As can be seen, the anode elements 14 are comprised of an ITO layer 22, a chrome layer 24 and the overlying protective photoresist layer 26 which remained by virtue of the shading provided by the mask 17 shown in FIG. 2. The photoresist layer 26 on the anode elements may be removed after the chrome layer has been etched from the cathode elements 12 in that the photoresist layer is not a conductor and therefore is not significant with respect to the electrophoretic effect during EPID operation. As can be seen from FIG. 3, both the cathode elements 12 and the guard elements 16 are formed solely from ITO, the chrome layer having been etched therefrom.

FIG. 4 shows a rear plate 30 bonded to the faceplate 10 via a mylar spacer 32 for forming an electrophoretic fluid containing envelope as is conventional in the art. The rear plate 30 includes a plurality of parallel ITO or chrome grid lines 34 disposed thereon at a density of approximately 200 lines per inch (LPI). The grid lines 34 are disposed at right angles to the anode and cathode elements 14, 12. The spacing between the front and the rear plates may be anywhere from 0.001 inch to 0.004 inches. After filling the electrophoretic display 28 with a suitable electrophoretic fluid suspension, the panel may be operated as follows. To place the panel in Erase mode, assuming yellow, negatively surface-charged pigment particles and visualization at the faceplate 10, the grid lines 34 are placed at zero volts, the anode elements 14 at zero volts and the cathode elements 12 at a positive voltage of approximately +15 volts. This causes all the pigment to move to the cathode elements 12 and the panel will appear completely yellow. To place the display in a Hold mode, a positive voltage of approximately 15 volts is applied to the anode elements 14. This has essentially no visual effect on an EPID in the Erase state. To write selected pixels, the grid lines 34 are loaded with data having either a zero or a negative voltage level. Zero voltage grid lines correspond to pixels to be written and negative voltage grid lines correspond to pixels which are not to be written. Having loaded the data into the grid elements 34, the cathode elements 12 are then sequentially placed at zero volts (scanned). At the intersection of a grid line 34 with zero voltage and an addressed cathode line, the pigment moves from the cathode element to the anode element 14 at +15 volts. If the grid element 34 intersected by the addressed cathode element 12 is at a negative voltage, the negative charge prevents pigment particles from moving from the cathode 12 to the anode 14 and the pixel remains unwritten.

Figure 5:
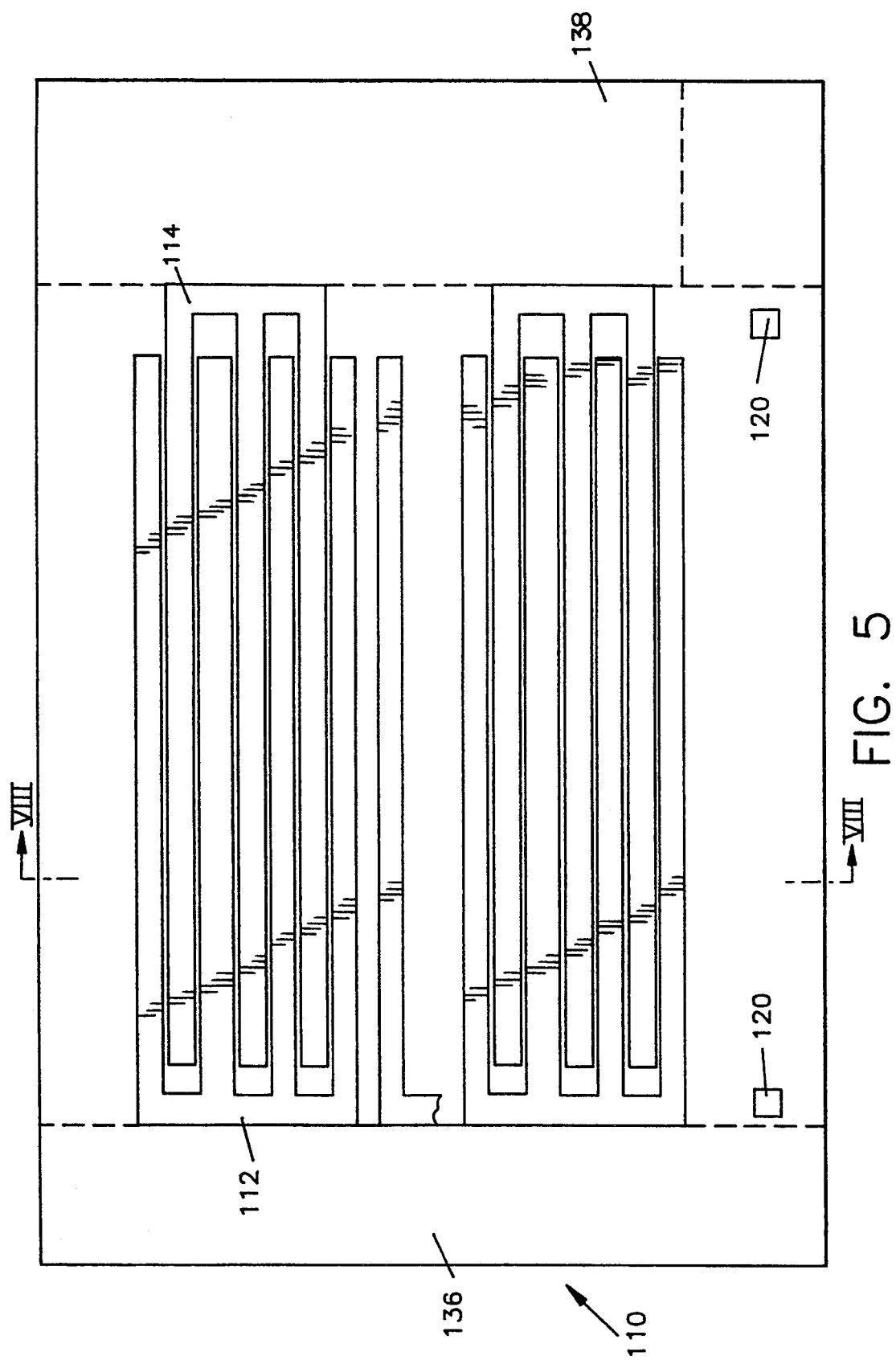
FIG. 5 is an enlarged plan view of the anode and cathode elements of a faceplate of an electrophoretic display in accordance with a second exemplary embodiment of the present invention.
Figure 6:
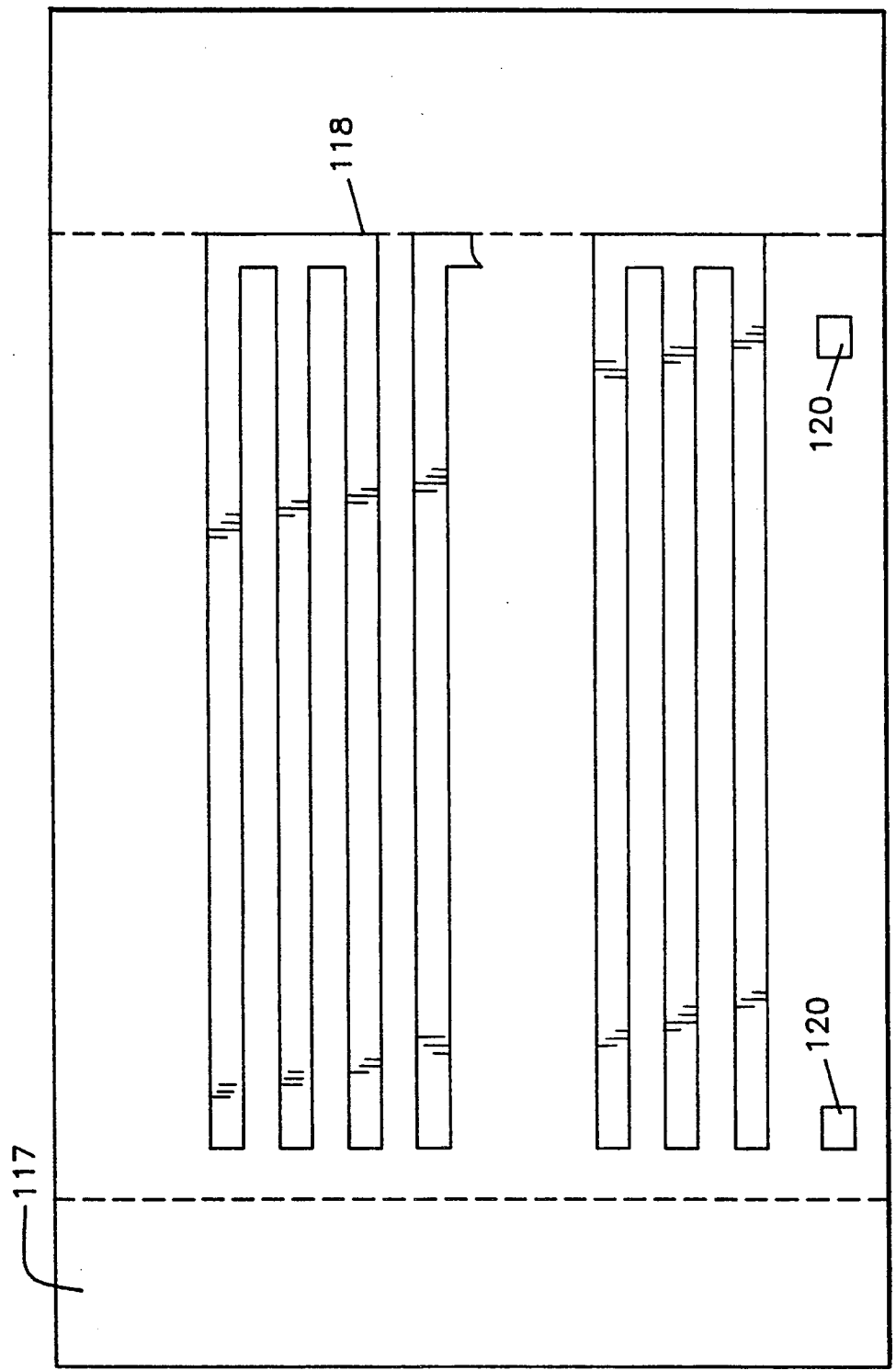
FIG. 6 is an enlarged plan view of a mask utilized to form the anode/cathode elements shown in FIG. 5.

FIG. 5 shows an alternative arrangement for a cathode/anode matrix from that which is shown in FIG. 1, in that a plurality of four-tined cathode elements 112 are disposed upon a faceplate 110 and interdigitized with a plurality of three-tined anode elements 114. No guard elements such as 16 in FIG. 1 are included in the plane of the cathode/anode matrix of FIG. 5. The configuration shown in FIG. 5 is fabricated by coating a glass sheet with ITO, which is then coated with a layer of chrome and a layer of photoresist. The resist is exposed using a mask having an identical configuration as that of the pattern shown in FIG. 5, given that positive acting photoresist is used. After developing the resist, the substrate is placed in a chrome etching solution and then rinsed with deionized water. The resulting substrate is then placed in an ITO etch and subsequently rinsed in deionized water. Using a mask of the form as shown in FIG. 6, the fiduciary marks 120 of the mask 117 are aligned with the fiduciary marks 120 of the faceplate 110 shown in FIG. 5. In this position, the anode mask elements 118 align with the anode elements 114 of the anode/cathode matrix. The substrate is then exposed and developed. After exposing, the substrate is placed in a chrome etch solution whereby the cathode element chrome is removed leaving only ITO. After cleaning, silicon dioxide is applied to the entire surface except the chip areas 136 and 138. A resist layer approximately 3 micrometers thick is then applied on the silicon dioxide layer. The resist is removed from the chip areas and the substrate is post-baked. A chrome layer of approximately 3,000 angstroms is then applied to the entire substrate. A layer of photoresist is applied to the chrome and pre-baked. Using the mask 140 with guard mask elements 142 shown in FIG. 7, the guard elements may be formed from the chrome layer previously applied. The mask 140 is aligned using the fiduciary marks 120 on the coated substrate and on the mask 140. After exposure and developing, the chrome layer is etched and the substrate rinsed with deionized water. The resulting panel may then be assembled to a backplate having grid elements thereon as shown in FIG. 4.

Figure 8:
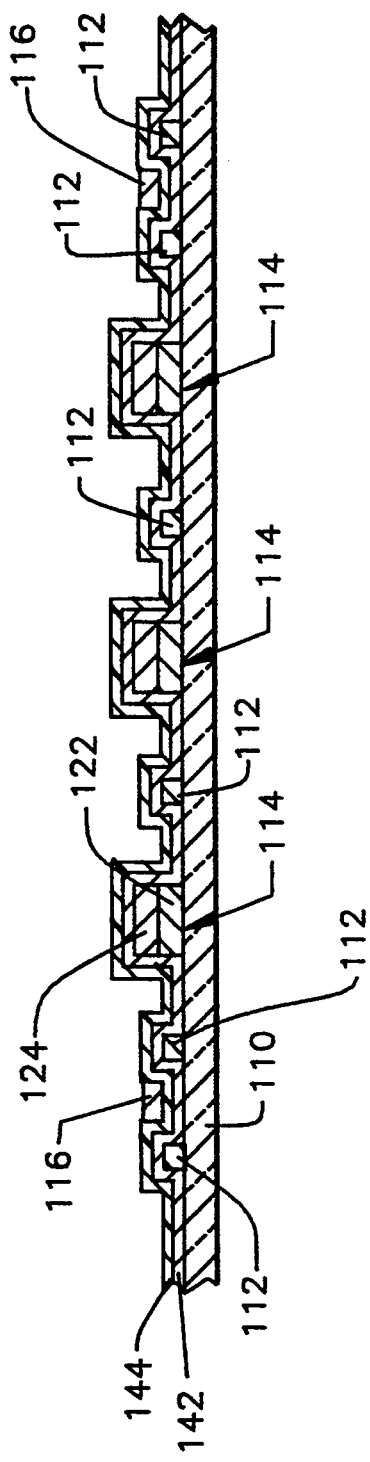
FIG. 8 is a cross-sectional view of a fragment of the anode/cathode faceplate of an electrophoretic display formed in accordance with the second exemplary embodiment of the present invention formed by utilizing the masks shown in FIGS. 6 and 7, with the anode/cathode element arrangement shown in FIG. 5, taken along section line VIII—VIII in FIG. 5 and looking in the direction of the arrows.

FIG. 8 shows the result of the foregoing process in cross-section. As in the previously described embodiment, the cathode elements 112 are comprised entirely of ITO, whereas the anode elements 114 have an ITO layer 122 and a chrome layer 124. Unlike the previously embodiment, the embodiment shown in FIG. 8 includes a layer of silicon dioxide 142 applied over the entire surface of the anode/cathode matrix, as well as a layer of hardened photoresist 144 which was post-baked. The 3,000 angstrom layer of chrome which was applied and etched away except in the areas covered by the guard mask 142 results in the presence of guard members 116 between groups of interdigitized anode and cathode elements 114, 112. The resist covering the cathodes and anode is then removed using a dry etching technique.

Figure 9:
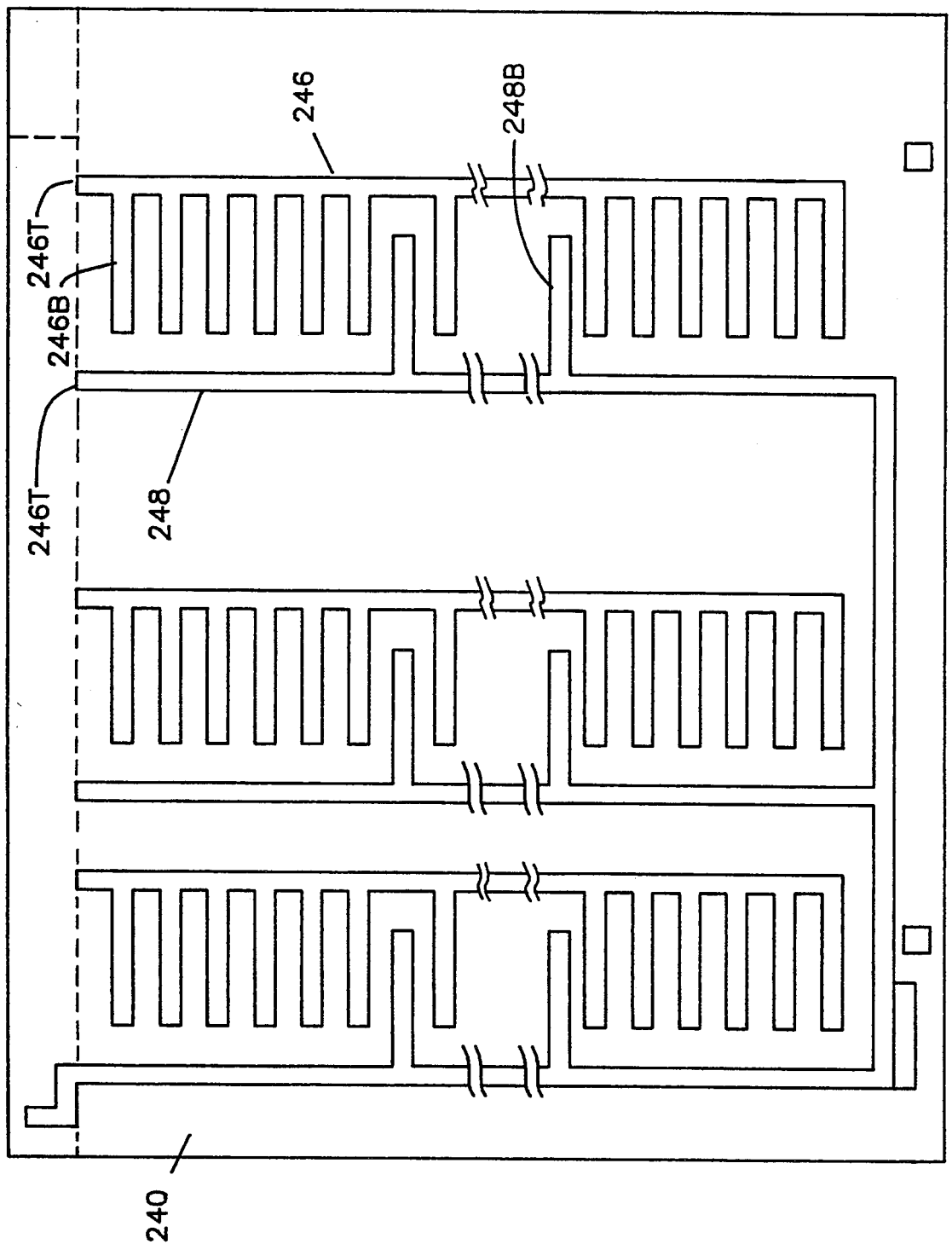
FIG. 9 is an enlarged plan view of a grid and guard element configuration in accordance with a third exemplary embodiment of the present invention which overlie the anode/cathode configuration shown in FIG. 5.
Figure 10:
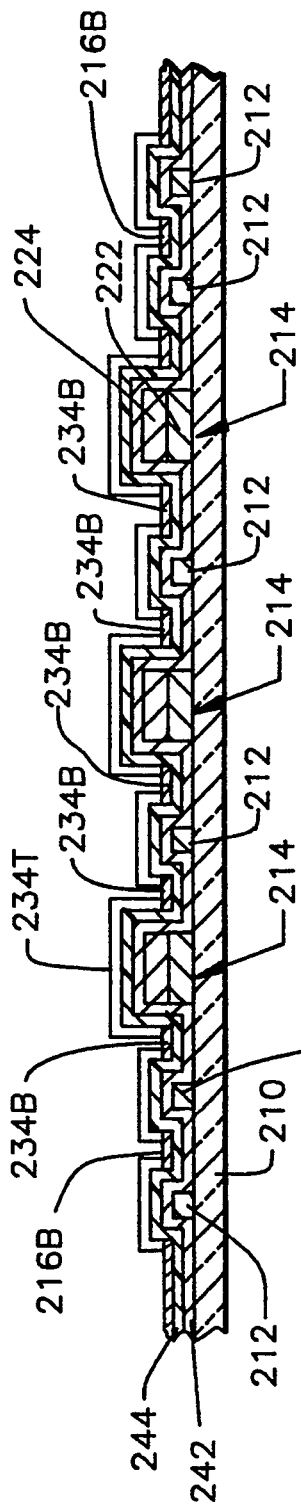
FIG. 10 is a cross-sectional fragmentary view of the anode/cathode faceplate shown in FIG. 5 with overlying grid and guard element configuration as shown in FIG. 9.

FIG. 10 shows yet another embodiment of the present invention wherein the cathode/anode matrix 212, 214, as well as the guard 216 and grid lines 234, are all formed upon a faceplate 210. The previous method of fabrication of the second embodiment is employed except that the mask 240, shown in FIG. 9, is employed in lieu of the mask 140 shown in FIG. 7 for etching the 3,000 angstrom thick chrome layer. The mask 240 shown in FIG. 9 illustrates that each grid mask element 246 is composed of a trunk portion 246T and a plurality of perpendicular branch portions 246B. Similarly, each guard mask element 248 is comprised of a trunk 248T and branches 248B. The grid and guard trunk and branch sections of the mask 240 correspond to associated trunks and branches in the grids 234 and the guards 216 of the electrophoretic display as can be appreciated by examining FIG. 10.

FIG. 10, like FIG. 8, illustrates a faceplate 210 having ITO cathode elements 212 interdigitized with anode elements 214 comprised of ITO layer 222 and overlying chrome layer 224. The interdigitized anode and cathode elements 214, 212 are overcoated by a layer of silicon dioxide 242 and a layer of hardened photoresist 244. As before, in the second embodiment in the process of forming the guards 116, a layer of chrome is applied thereover with an overlying layer of photoresist which is then exposed using the mask shown in FIG. 9. This leaves the pattern shown in FIG. 9 overlying the anode/cathode matrix. The mask of FIG. 9 is aligned with the substrate such that the grid elements branch portion 234B are intermediate the interleaved anode 214 and cathode 212 elements. The intermediate grid elements branch portions 234B, as well as the trunk portion 234T is visible in FIG. 10. In addition, the application of the mask of FIG. 9 results in the formation of guard elements 216 having branches 216 disposed intermediate adjacent anode/cathode 214, 212 pairs. The trunk portion 216T of the guard 216 is not visible in this view, but would have a configuration similar to the trunk portion 234T of the grid elements. After etching the 3000 Å chrome layer to form the guards and the grids, the photoresist on the cathodes and anodes is removed using a dry etching technique. Since the anode 214, cathode 212, guard 216 and grid 234 elements are all formed on the faceplate 210 in the last embodiment, the rear plate for forming the electrophoretic envelope need not have any conductor lines formed thereon and may be instead a clear glass sheet. What is achieved then in the third embodiment is a single plane triode. Certain advantages are realized in the previously described embodiments. Namely, since there is a minimal spacing between the cathodes and the anodes and, in the third embodiment, the grid, relatively small voltages can be used to move the pigment particles. These configurations also permit writing in either direction and thereby permit the writing and erasure of a single pixel. The above described EPIDs also allow for rapid changes in the information being presented.

It should be understood that the embodiments described herein are merely exemplary and that a person skilled in the art may make many variations and modifications without departing from the spirit and scope of the invention as defined in the appended claims.

What is claimed is:

1. An electrophoretic display, comprising:
   a housing having at least one generally transparent faceplate, said housing capable of retaining a plurality of electrophoretic particles suspended in a solution;
   a plurality of generally parallel cathode lines disposed on said faceplate;
   a plurality of anode lines interpositioned between said cathode lines on said faceplate, wherein said anode lines lay generally parallel to said cathode lines;
   a plurality of grid lines disposed in an orientation generally perpendicular to said cathode lines and said anode lines, whereby the flow of said electrophoretic particles between said cathode lines and said anode lines is controlled by selectively applying electrical potentials to said cathode lines, anode lines and grid lines.

2. The device of claim 1, wherein said anode lines have a thickness greater than said cathode lines such that said anode lines extend away from said faceplate a greater distance than said cathode lines.

3. The device of claim 1, wherein said anode lines and said cathode lines are each part of a tined configuration, wherein the tines of said cathode lines are interdigitized with the tines of said anode lines.

4. The device of claim 3, wherein each of said anode lines is disposed between two of said cathode lines.

5. The device of claim 1, further including a plurality of guard lines disposed on said faceplate, said guard lines controlling the extent of the flow of said electrophoretic particles between said anode lines and said cathode lines.

6. The device of claim 1, further including a semiconductor coating over said cathode lines and said anode lines.

7. The device of claim 6, further including a layer of insulator material deposited over said semiconductor coating.

8. The device of claim 7, wherein a plurality of guard lines overlie said insulator material.

9. The device of claim 8, wherein said grid lines are disposed upon said insulator material.

10. The device of claim 9, wherein each of said grid lines have a trunk portion running perpendicular to said cathode lines with at least one branch extending from said trunk portion parallel to said cathode lines.

11. The device of claim 10, wherein said at least one grid line branch is a plurality of branches positioned generally intermediate the interdigitized tines of said anode and cathode lines.

12. The device of claim 8, wherein each of said guard lines have a trunk portion running perpendicular to said cathode lines with at least one branch extending from said trunk portion parallel to said cathode lines.

13. The device of claim 12, wherein said at least one guard line branch is a plurality of branches positioned generally intermediate adjacent pairs of said anode and cathode lines.

14. The device of claim 6, wherein said semiconductor is silicon dioxide.

15. The device of claim 7, wherein said insulator is a photoresist.

16. The device of claim 5, wherein at least one of said guard lines is disposed between each adjacent pair of said anode and cathode lines.

17. The device of claim 16, wherein said grid lines are disposed upon a backplate spaced away from said faceplate.

18. The device of claim 2, wherein said cathode lines are formed from a single layer of conductor material and said anode lines include at least two layers of conductor material.

19. The device of claim 18, wherein said single layer is indium tin oxide and said at least two layers include a layer of indium tin oxide and a layer of chrome.

20. A method of fabricating an EPID, comprising the steps of:
   providing a faceplate:

forming a plurality of generally parallel cathode lines on the faceplate of said EPID;

forming a plurality of generally parallel anode lines on the faceplate, wherein said plurality of said anode lines are generally parallel to said cathode lines and are interposed with said cathode lines on said faceplate;

forming a plurality of grid lines generally perpendicular to said anode lines and said cathode lines, wherein said grid lines are disposed away from said faceplate;

forming a fluid containing envelope utilizing said faceplate; and (e) filling said envelope with electrophoretic fluid.

21. The method of claim 20, further including the steps of covering said cathode lines and said anode lines with a coating of semiconductor material.

22. The method of claim 20, further including the step of forming a plurality of guard elements on said faceplate.

23. The method of claim 21, further including the step of forming guard lines upon said insulator material.

24. The method of claim 21, wherein said grid lines are formed upon said insulator material.

25. The method of claim 23, wherein said EPID includes a backplate and said grid lines are formed upon said backplate of said EPID.

26. The method of claim 20, wherein said anode and cathode lines are formed by:

coating one side of said faceplate with indium tin oxide;

overcoating the indium tin oxide with a layer of chrome;

overcoating the chrome layer with photoresist;

exposing the photoresist through a mask having the anode and cathode line pattern thereon;

developing the photoresist;

etching the chrome layer;

etching the indium tin oxide layer;

reexposing the resulting substrate through a mask shading the anode elements only;

developing the photoresist; and etching the chrome layer.

27. The device of claim 1, wherein said plurality of grid lines are disposed a predetermined distance from said faceplate.

28. The device of claim 1, wherein said plurality of grid lines are disposed on said faceplate.

* * * * *